(12) United States Patent
Ghio

(10) Patent No.: US 6,257,223 B1
(45) Date of Patent: Jul. 10, 2001

(54) DIAMOND-SET WIRE FOR CUTTING STONY MATERIALS AND THE LIKE, AND A METHOD OF PRODUCING THE WIRE

(75) Inventor: Giuseppe Ghio, Santena (IT)

(73) Assignee: Dulford Properties Limited, Dublin (IE)

(*) Notice: Subject to any disclaimer, the term of this patent is extended or adjusted under 35 U.S.C. 154(b) by 0 days.

(21) Appl. No.: 09/367,187
(22) PCT Filed: Feb. 9, 1998
(86) PCT No.: PCT/EP98/00710
§ 371 Date: Oct. 6, 1999
§ 102(e) Date: Oct. 6, 1999
(87) PCT Pub. No.: WO98/35778
PCT Pub. Date: Aug. 20, 1998

(30) Foreign Application Priority Data

Feb. 12, 1997 (IT) ................................. TO97A0111

(51) Int. Cl.[7] .................................................. B25D 1/02
(52) U.S. Cl. ............................................... 125/12; 125/21
(58) Field of Search ................................. 125/12, 18, 21

(56) References Cited

U.S. PATENT DOCUMENTS

| | | | | |
|---|---|---|---|---|
| 1,065,833 | * | 6/1913 | Peckover | 125/18 |
| 4,097,246 | * | 6/1978 | Olson | 51/309 R |
| 4,674,474 | * | 6/1987 | Baril | 125/21 |
| 4,907,564 | * | 3/1990 | Sowa et al. | 125/21 |
| 5,216,999 | * | 6/1993 | Han | 125/21 |
| 5,377,659 | * | 1/1995 | Tank et al. | 125/21 |
| 5,749,775 | * | 5/1998 | Fish | 451/298 |
| 6,021,773 | * | 2/2000 | Svensson | 125/21 |

FOREIGN PATENT DOCUMENTS

| | | |
|---|---|---|
| 2 154 428 | 5/1973 | (DE) . |
| 91 08 725 | 11/1992 | (DE) . |
| 195 16 999 | 11/1996 | (DE) . |
| 0 761 356 | 3/1997 | (EP) . |
| 74920 | 6/1961 | (FR) . |
| 2 495 535 | 6/1982 | (FR) . |
| 1 231 858 | 1/1992 | (IT) . |
| 1 236 131 | 1/1993 | (IT) . |
| 1 266 675 | 1/1997 | (IT) . |
| 1070012 | 1/1984 | (SU) . |

OTHER PUBLICATIONS

EPO International Search Report for Application No. PCT/EP98/00710.

* cited by examiner

Primary Examiner—Eileen P. Morgan
Assistant Examiner—Hadi Shakeri
(74) Attorney, Agent, or Firm—Merchant & Gould P.C.

(57) ABSTRACT

A diamond-set wire for cutting stony materials or the like, comprises a cable (5; 25) to which a series of abrasive units (3; 23) is connected. Each abrasive unit (3; 23) includes a cutting member (7; 27) which has at least one portion made of abrasive material (9; 29) disposed radially on the outside of the cable (5; 25), the portions of the cutting members (7; 27) made of abrasive material (9; 29) being spaced apart along the cable (5; 25). Each abrasive unit (3; 23) is anchored to the cable (5; 25) by means of a plastics or elastomeric filling material (18; 38) interposed between the unit and the cable (5; 25). The adjacent abrasive units (3; 23) are arranged in contact with one another.

15 Claims, 2 Drawing Sheets

Figure 1:
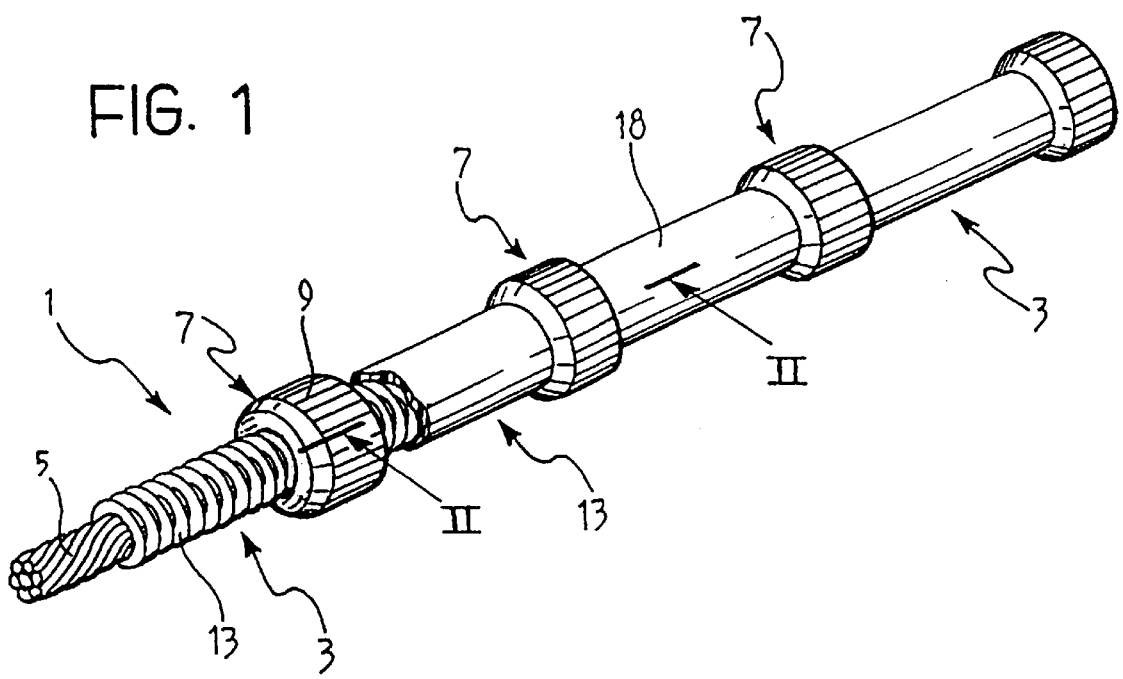

DIAMOND-SET WIRE FOR CUTTING STONY MATERIALS AND THE LIKE, AND A METHOD OF PRODUCING THE WIRE

The present invention relates to a diamond-set wire for cutting stony materials and the like, comprising a cable to which a series of abrasive units is connected, each abrasive unit including a cutting member which has at least one portion made of abrasive material disposed radially on the outside of the cable, the portions of the cutting members made of abrasive material being- spaced apart along the cable and each abrasive unit being anchored to the cable by means of a plastics or elastomeric filling material interposed between the unit and the cable.

Known diamond-set wires of the type indicated above are generally used for sawing blocks of stony material, particularly granite blocks. Each cutting member of these known wires constitutes an entire abrasive unit known as a "pearl" or "bead" and is spaced from the adjacent units. All of these units are then fixed to the cable by the co-moulding of a plastics or polymeric filling material thereon, in a manner such that some of the material penetrates between each unit and the cable thus anchoring the abrasive units to the cable. The co-moulded material thus also performs the function of a spacer element between successive abrasive units. However, this filling material tends to deteriorate quite quickly in the regions interposed between successive abrasive units because of the high thermal and mechanical stresses to which the wire is subject in use, so that the operation of this material as a spacer element is of fairly short duration, requiring frequent replacement of the wire in order for the cutting operation to continue, and consequently requiring repair of the damaged wire.

Diamond-set wires normally used for sawing marble blocks are also known, in which the various abrasive units are mounted on the cable so as to be rotatable relative thereto. In this case, an independent spacer spring is disposed between one abrasive unit and the next, and is normally pre-loaded with its respective ends in abutment against the two adjacent abrasive units with the interposition of coaxial spacer rings. However, this type of free mounting of the abrasive units is not considered very safe since, in the event of a breakage of the cable, the abrasive units and the spacer springs are thrown in random directions at high speed, resulting in serious danger to any operators in the vicinity.

The object of the present invention is to provide a diamond-set wire of the type indicated above which can be used for sawing stony materials of various kinds such as marble, granite or concrete, which is more reliable and safer than the wires used previously, and which has a longer useful life.

This object is achieved by virtue of the fact that adjacent abrasive units are arranged in contact with one another.

The wire thus has greater mechanical strength in the regions between successive abrasive portions so that the relative positions of the abrasive units are subject to less variation in use, advantageously reducing the frequency of wire-replacement and maintenance operations.

According to a preferred aspect of the invention, the diamond-set wire is also characterized in that the cutting members are supported by at least one support element surrounding at least part of an axial portion of the cable, this support element being incorporated in the filling material.

By virtue of this characteristic, the diamond-set wire retains good flexibility, mechanical strength and resistance to heat, and is inexpensive to produce. In particular, the portion of each abrasive unit which acts as a spacer relative to the adjacent unit and/or relative to the cable adopts the general structure of a body made of composite material in which the support element constitutes the reinforcing portion, incorporated in a matrix of plastics or elastomeric filling material.

A further subject of the invention is a method of producing a diamond-set wire for cutting stony materials or the like, characterized in that it comprises the steps of:

providing a cable, providing a plurality of abrasive units each of which includes a cutting member which has at least one portion made of abrasive material, associating the abrasive units in contact with one another to the cable, in a manner such that their portions made of abrasive material are arranged radially on the outside of the cable and spaced apart, anchoring the abrasive units to the cable by applying a plastics or elastomeric filling material in a manner such that the filling material is interposed between the cable and each abrasive unit.

Figure 2:
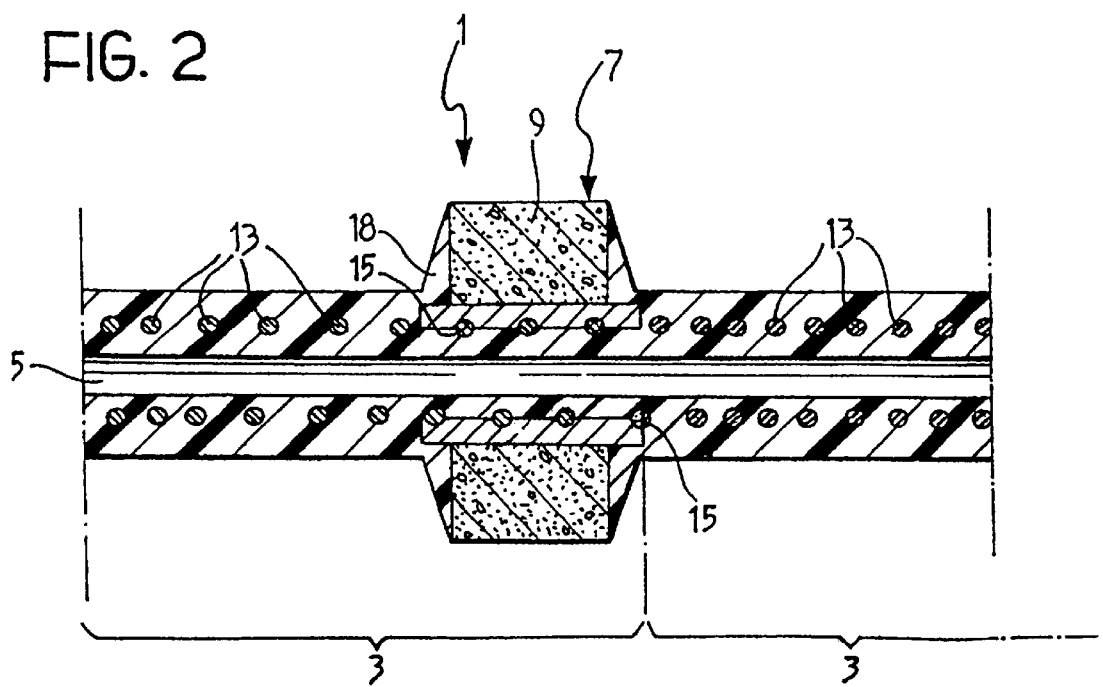
Figure 3:
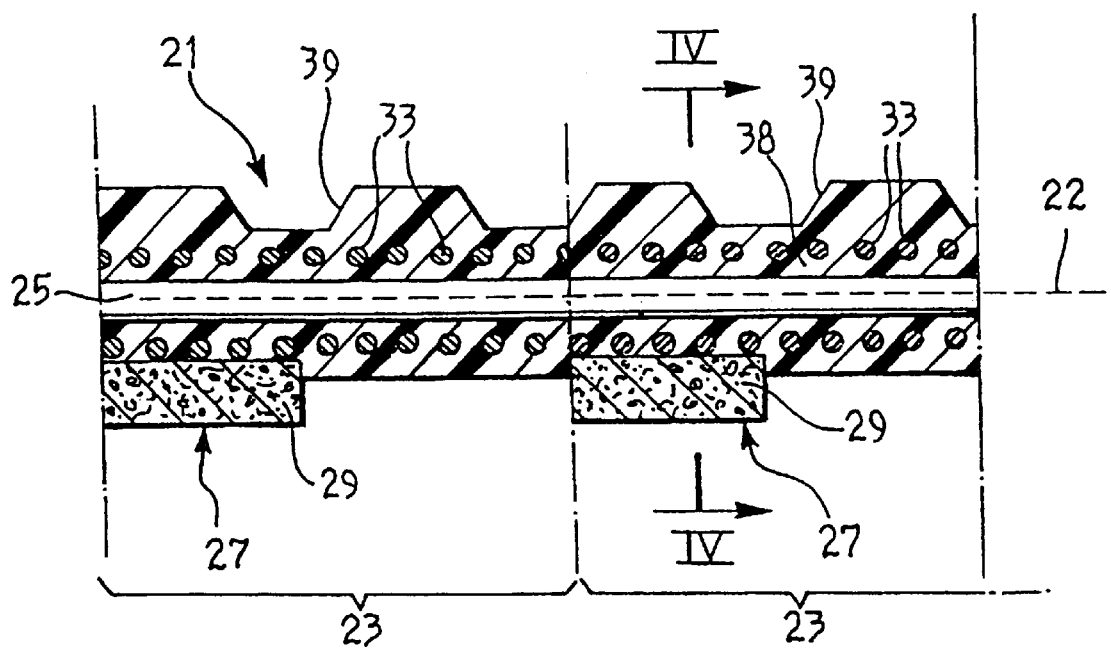
Figure 4:
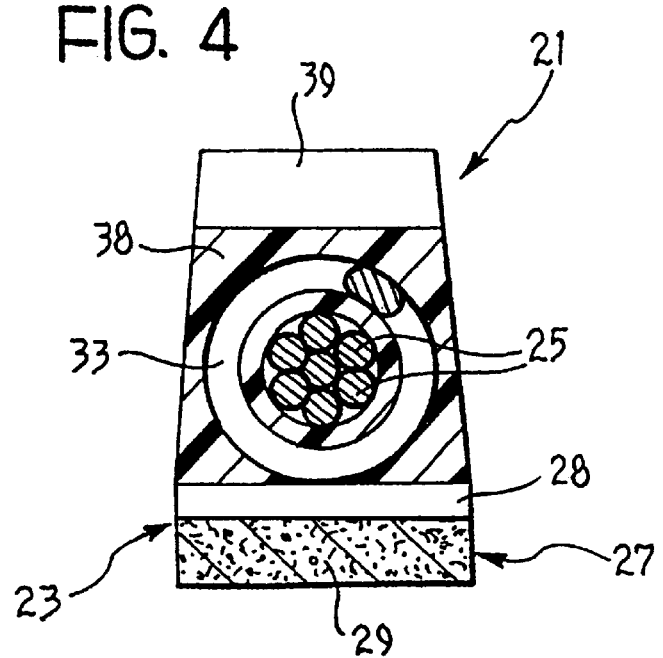

Further characteristics and advantages of the invention will become clearer from the following detailed description, given purely by way of non-limiting example with reference to the appended drawings, in which:

FIG. 1 is a perspective view of a portion of diamond-set wire formed in accordance with a first embodiment of the invention, FIG. 2 is an axially-sectioned elevational view taken on the line II—II of FIG. 1, on an enlarged scale, FIG. 3 is an axially-sectioned elevational view of a diamond-set wire formed in accordance with another embodiment of the invention, and FIG. 4 is a front elevational view sectioned on the line IV—IV of FIG. 3.

With reference initially to FIGS. 1 and 2 which show a first embodiment of the invention, a diamond-set wire, indicated 1, is intended for cutting stony materials such as marble, granite or concrete, particularly for extracting blocks of marble or granite from a quarry or for cutting such blocks into slabs or semi-finished products. Although the drawings show only a portion of the wire, it is well known that an endless loop of wire wound around pulleys and subjected to a fast sliding movement is used for sawing such materials.

The wire 1 comprises a metal-stranded cable 5 on which a series of abrasive units 3 is arranged coaxially. Each unit 3 includes a cutting member 7, for example, constituted by a metal bush 11, on the outer surface of which an annular portion 9 of abrasive material, normally produced by the sintering of metal powder and diamond powder mixed together, is fixed, typically by brazing.

The cutting members 7 are advantageously supported by a support element which surrounds at least part of an axial portion of the cable 5. The support element may be constituted by a helical spring 13 which is coaxial with the cable 5 and to which at least one respective cutting member 7 is fixed.

According to a preferred characteristic, each bush 11 is fixed to a respective spring 13. For this purpose, each bush 11 may have an internal helical groove 15 which can be engaged by the coils of the spring 13 by relative forcing, for example, as a result of the pitch of the groove 15 being different from the pitch of the spring 13 in its undeformed condition, or as a result of the outside diameter of the groove being smaller than the diameter of the undeformed spring. Alternatively, the internal surface of each bush 11 may be smooth but with an inside diameter smaller than the outside diameter of the respective helical spring 13 in the undeformed condition so that, as a result of the insertion of the spring 13 in the bush 11, the spring contracts radially so as to be force-fitted in the bush 11. Naturally, a cutting member 7 may be fixed to the respective spring 13 by means of another known connection system such as welding or gluing. In particular, each cutting member 7 may be connected to a respective spring 13 by butt-welding or welding inside the bush 11.

The various abrasive units 3 are then arranged in contact with one another along the cable 5, in a manner such that the abrasive portions 9 of adjacent units 3 are spaced apart along the cable, for example, at regular intervals of a few centimetres.

A plastics or elastomeric filling material 18 such as synthetic rubber, for example polyurethane rubber, is co-moulded or injected under pressure over the wire 1 thus formed. The material 18 thus incorporates the cable 5, the springs 13 and the cutting members 7, possibly leaving the radially outer surfaces of the abrasive portions 9 free. In particular, the material 18 penetrates the spaces between the bushes 11 and the cable 5, anchoring the abrasive units 3 to the cable 5.

The portions of the springs 13 which are disposed between pairs of successive cutting members 7 are thus incorporated in the filling material 18 so as to constitute spacer elements interposed between the members 7 and formed of composite material comprising a helical wire incorporated in a matrix of plastics or elastomeric material.

According to another embodiment shown in FIGS. 3 and 4, the invention provides for the production of a diamond-set wire 21 for dividing blocks of stony material into slabs. In this embodiment, a plurality of wires 21 may, for example, be arranged parallel, in place of the metal blades generally used for this purpose, on a blade-holder frame of a frame saw of known type in which the blade-holder frame is subjected to reciprocating motion relative to a block to be sawn.

According to an alternative solution, a plurality of parallel endless wire loops 21 which are wound on respective sets of pulleys are set in motion together at high speed as well as being displaced gradually in a direction perpendicular to their movement so as to interfere with a block of stony material in order simultaneously to produce a plurality of slabs therefrom.

The wire 21 comprises a metal-stranded cable 25 with which a series of abrasive units 23 is associated. The wire defines an axis 22. Each unit 23 comprises a generally parallelepipedal or trapezoidal cutting member 27 having at least one portion made of abrasive material 29. In particular, each cutting member 27 may be constituted by a rectangular-based block made of sintered metal and diamond powders. Alternatively, each cutting member 27 may be formed as a metal base plate 28 to which a layer of abrasive material 29 layer, again made of sintered metal and diamond powders, is applied and is fixed to the plate by brazing or another known connection system.

The cutting members 27 are then connected to a support element which is preferably constituted by a helical spring or by a series of helical springs 33 coaxial with the cable 25. The members 27 may be connected, for example, to a respective spring 33, by the welding of each abrasive member 27 to the radially outer edges of a few coils of the respective spring 33.

The abrasive units 23 are then fitted on the cable 25, their portions 29 made of abrasive material being aligned axially along one side of the cable 25, preferably in a manner such that the two longer sides of the rectangular base of each portion 29 are aligned and parallel with the axis of the cable 25. In this embodiment, adjacent abrasive units 23 are again arranged in contact with one another and in a manner such that the abrasive portions 29 of adjacent units 23 are spaced apart along the cable 25, for example, at regular intervals of a few centimetres.

In order to fix the abrasive units 23 to the cable 25, a plastics or elastomeric filling material 38, for example, a polyurethane synthetic rubber is co-moulded over them. The material 38 penetrates between the cutting members 27 and the cable 25 and between the cable and the springs 33, thus anchoring the abrasive units 23 to the cable 25.

If the wire 21 is to be used in apparatus comprising a plurality of parallel wires 21 each wound around a plurality of pulleys for defining its path and for moving it at high speed in order to cut blocks of stony material into slabs, the wire preferably has teeth 39 formed by shaping of the filling material 38 on the side opposite the cutting members 27. The teeth 39 are intended to mesh with corresponding teeth formed on each of the various pulleys around which it is wound. Moreover, the various pulleys around which each wire 21 is wound are connected for rotation with corresponding pulleys of the other parallel wires 21 so that the speed of movement of all of the wires 21 is kept synchronous. This prevents relative slippage between the various parallel wires 21 so as to prevent the wires from being subjected to different tensions which could be caused by the structural tolerances of the wires and the pulleys if the wires 21 were simply engaged on the respective pulleys by friction.

What is claimed is:
1. A diamond-set wire adapted for cutting, comprising:
   a cable;
   a filling material disposed on said cable;
   at least one flexible support element disposed on said cable an connected thereto by said filling material;
   a plurality of abrasive units connected to said at least one flexible support element and in contact with said filling material, each abrasive unit comprising a rigid cutting member comprising abrasive material, each rigid cutting member being fixed to said at least one flexible support element, each of said abrasive units projecting axially beyond said cutting member in at least one direction; and
   a plurality of teeth comprised of said filling material;
   wherein
      adjacent abrasive units are arranged in contact with one another; said abrasive portions are spaced apart along said cable;
      said cutting members are substantially parallelepipedal;
      said abrasive portions are radially aligned with one another along an axis of said cable;
      said teeth are disposed on a side of said cable that is opposite said cutting members.
2. A diamond-set wire according to claim 1, wherein said at least one support element comprises at least one helical spring arranged coaxially about said cable.
3. A diamond-cut wire according to claim 2, wherein each cutting member is welded to said at least one helical spring.
4. A diamond-set wire according to claim 4, wherein each of said support elements for said cutting members comprises a helical support spring.
5. A diamond-set wire according to claim 1, wherein each cutting member comprises a metal base plate with said abrasive portion comprising a layer of sintered abrasive material disposed thereon.

6. A diamond-set wire according to claim 1, wherein said wire is adapted to engage at least one pulley, and wherein said teeth are adapted to engage corresponding teeth on said at least one pulley.

7. A method of producing a diamond-set wire adapted for cutting, comprising the steps of:

disposing at least one flexible support element on a cable;

disposing a plurality of abrasive units on said at least one flexible support element, each of said abrasive units comprising a substantially parallelepipedal rigid cutting member comprising at least one abrasive portion, said abrasive units projecting axially beyond said cutting member;

arranging said abrasive units in contact with one another such that said abrasive portions are radially aligned with one another along an axis of said cable and are spaced apart along said cable;

applying a filling material to said cable such that said filling material penetrates between said cable and each abrasive unit and encapsulates said at least one flexible support element;

forming a plurality of teeth from said filling material on a side opposite said cutting members.

8. A method according to claim 7, wherein said support element comprises at least one helical spring.

9. A method according to claim 8, further comprising the step of welding each cutting member to said at least one helical spring.

10. A method according to claim 7, comprising the step of disposing a support element for each cutting member on said cable, further comprising the step of fixing each cutting member to one of said support elements.

11. A method according to claim 7, wherein each cutting member comprises a metal base plate with said abrasive portion comprising a layer of sintered abrasive material disposed thereon.

12. A method according to claim 7, wherein said wire is adapted to engage at least one pulley, further comprising the step of forming said teeth so as to be adapted to engage corresponding teeth on the pulley.

13. A diamond-set wire according to claim 2, comprising a support element for each cutting member.

14. A diamond-set wire according to claim 5, wherein said abrasive portion comprises sintered-diamond set material.

15. A method according to claim 10, wherein each of said support elements for said cutting members comprises a helical support spring.

* * * * *